United States Patent [19]

Fromson

[11] Patent Number: 4,541,909
[45] Date of Patent: Sep. 17, 1985

[54] CONTROLLED METAL REMOVAL BY PARALLEL-TO-FACE ELECTROCHEMICAL MACHINING

[75] Inventor: Robert E. Fromson, Wilkins Township, Allegheny County, Pa.

[73] Assignee: Westinghouse Electric Corp., Pittsburgh, Pa.

[21] Appl. No.: 632,977

[22] Filed: Jul. 20, 1984

[51] Int. Cl.⁴ .............................. B23P 1/02; B23P 1/12
[52] U.S. Cl. .............................. 204/129.2; 204/224 M
[58] Field of Search .......... 204/129.2, 224 M, 129.46, 204/212

[56] References Cited

U.S. PATENT DOCUMENTS

| | | | |
|---|---|---|---|
| 3,445,372 | 5/1969 | Fromson | 204/224 M X |
| 3,489,671 | 1/1970 | Stark et al. | 204/224 M X |
| 3,625,853 | 12/1971 | Melvin et al. | 204/224 M |
| 4,101,405 | 7/1978 | Inoue | 204/224 M |
| 4,170,528 | 10/1979 | Mathews | 204/129.46 X |
| 4,439,660 | 3/1984 | Inoue | 204/212 X |
| 4,456,516 | 6/1984 | Schaffner | 204/224 M X |

*Primary Examiner*—Donald R. Valentine
*Attorney, Agent, or Firm*—R. A. Stoltz

[57] ABSTRACT

This is an electrochemical machining process for removing high spots from the surface of reactive metal workpieces. The process utilizes measuring of the workpiece to locate high spots (imperfections), then positioning a wedge-shaped, zero-angle electrochemical machining tool with its center line aligned with the center of the high spot, and then moving the tool parallel to the workpiece surface across the high spot at a product of current times inverse of speed essentially proportional to the amount of material to be removed. Preferably, the speed of tool movement is maintained essentially constant and the current is varied proportionally to the amount of material along the center line of the high spot which is to be removed.

6 Claims, 5 Drawing Figures

CONTROLLED METAL REMOVAL BY PARALLEL-TO-FACE ELECTROCHEMICAL MACHINING

BACKGROUND AND SUMMARY OF THE INVENTION

The present invention relates to a process for electrochemically removing high spots from the surface of reactive metal work pieces. It utilizes parallel-to-face, as opposed to perpendicular-to-face, electrochemical machining with a shaped electrode.

Typically, electrochemical machining is done in a perpendicular-to-face (cavity sinking) mode. Generally, electrolyte is pumped through the center of the electrode and flows outward, typically in an uncontrolled manner off the workpiece and into a sump from where it is recirculated. A voltage between the tool and the workpiece allows material to be deplated off the workpiece surface through the electrically conductive electrolyte (e.g. NaCl or $NaKNO_3$. Generally, the tool is fed into the workpiece at a conservatively slow speed to avoid arcing.

Avoiding arcing is especially crucial in reactive metals as arcing can create large particles of insoluble oxide which interfere with surface removal. As a result, electrochemical machining is generally not used with reactive metal workpieces.

Reactive metal parts have generally been finished by grinding. Grinding, however, is a slow and expensive process.

In U.S. Pat. No. 3,445,372, issued to Fromson on May 20, 1969, electrochemical machining parallel to the surface is taught using shallow angles down to zero, and an electrode shaped to uniformly remove material by compensating for circular travel. All portions of the workpiece are under the electrode for the same length of time, the electrode being larger moving out from the center of rotation to compensate for the more rapidly moving surface. In the preferred embodiment with an angled face, speed of travel is dictated by the angle and rate of material removal.

It has been discovered that reactive metal workpieces can be electrochemically machined to remove high spots. This can be done successfully on both sheet and tubes. It has been found that in tubes, for example, such imperfections generally taper relatively smoothly in all directions from a high spot. Thus, a single wedge-shaped tool can be used to remove most imperfections from a given type of product.

The speed and/or current can be controlled to vary the amount of material removed along center line of tool movement and the wedge shape of the tool results in correspondingly less material removal off the tool center line (e.g. with a triangular tool material removal with respect to center line removal is inversely proportional to distance from center line).

First, the workpiece is measured to locate a high spot to be removed. Then, a wedge-shaped, zero-angle electrochemical machining tool is positioned such that the region where the most metal will be removed is in line with the center of the tool. The tool is then moved parallel to the workpiece surface across the high spot at an inverse of speed times current product essentially proportional to the amount of material to be removed along the tool movement center line. Thus, as the tool is moved, initially relatively little material is removed, then as it approaches the high spot more and more material is removed, reaching a maximum removal at the high spot and then tapering back down. With sheet, removal of center thickening (such as results from roll deflection in a rolling mill) may be relatively constant and constant speed and current may be used for relatively long distances, with the wedge shape of the tool providing for less material removal off the center line of the strip.

BRIEF DESCRIPTION OF THE DRAWINGS

The invention can be best understood by reference to the following drawings in which.

DESCRIPTION OF THE PREFERRED EMBODIMENTS

Figure 1:
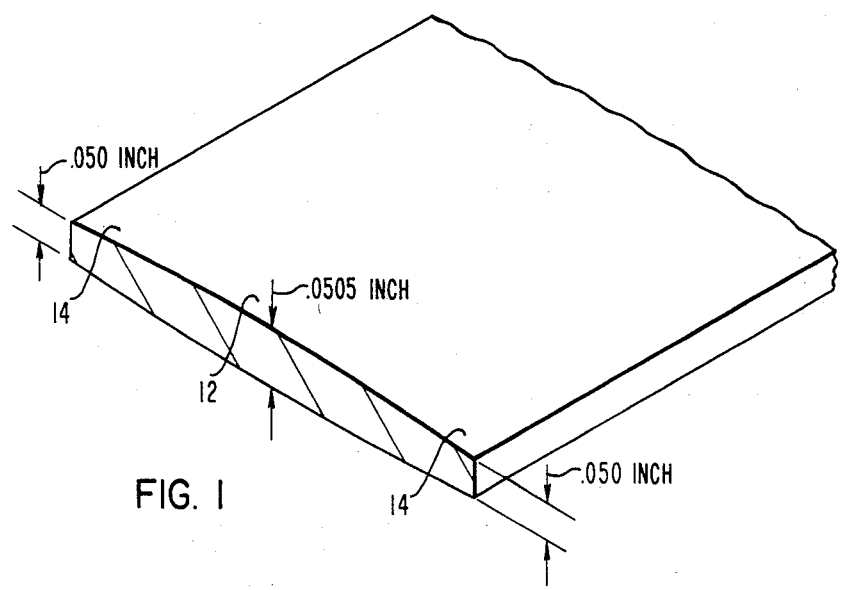
FIG. 1 shows a typical cross-section of a strip having a high crown imperfection.

FIG. 1 shows, in exaggeration, the crowning which often occurs in production of a flat strip. It can be seen that the maximum metal removal required is at or near the center of the strip and that the amount of material to be removed tapers smoothly in both directions. At a given current, the material removal by electrochemical machining is generally proportional to the amount of time under the electrode (the voltage between the electrode and the workpiece being constant over the electrode area) it can be seen that the higher portions of the crown, requiring more metal removal, need to be kept under the electrode longer. This is accomplished by the wedge-shaped electrode which is longer in the center of the strip 12 than at the edges 14 (normally, tolerances can be achieved with a tool which is less than the full width of the strip). As the tool is moved parallel to the surface (perpendicular to the cross-section as shown in FIG. 1) the tool is over the center portion 12 longer than the outside portions 14, and thus more metal is removed in the center, flattening the strip to within specifications. In strip material, the high spot may remain relatively constant for long lengths of strip and thus the speed and current product may be maintained relatively constant for a major portion of the strip.

Figure 2:
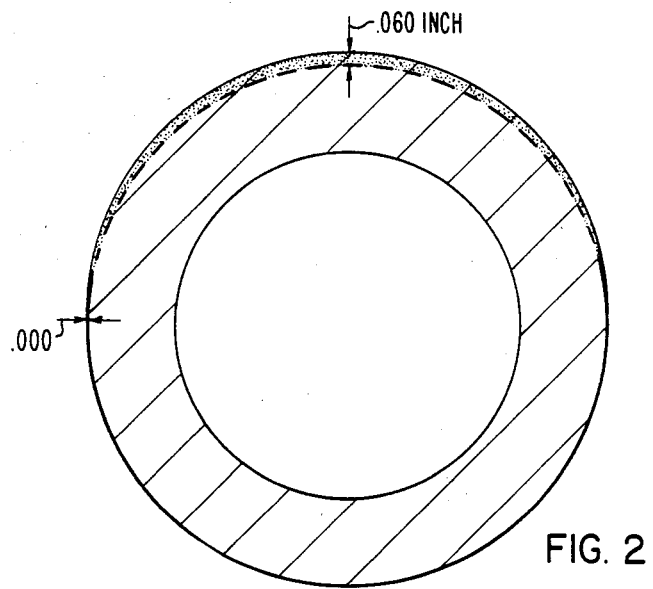
FIG. 2 shows contour lines on a tube surface illustrating an imperfection of the tube exterior.

FIG. 2 illustrates an imperfection in a tube. While occasionally a long imperfection analogous to a crown in a tube appears, typically such imperfections are relatively short in tubes and at varying angles around the tube. When such an imperfection is located, a wedge-shaped tool having a conductive face similar to FIG. 3A, for example, but modified into a half cylinder to fit approximately halfway around the particular type of tube can be used. The tube is rotated under the electrochemical machining tool to line the center of the high spot with the center of the tool's conductive face. The tool is then moved parallel to the surface (generally longitudinally parallel to the axis of the tube). The tool can be steered to, for example, follow a helical imperfection. The product of the current times the inverse of tool speed is controlled to be essentially proportional to the amount of metal to be removed along the center line of tool movement. The amount of material removed off the center line is proportionally less due to the wedge shape of the tool. With an appropriate electrode, material can also be removed from the inside of a tube using this invention.

Figure 3A:
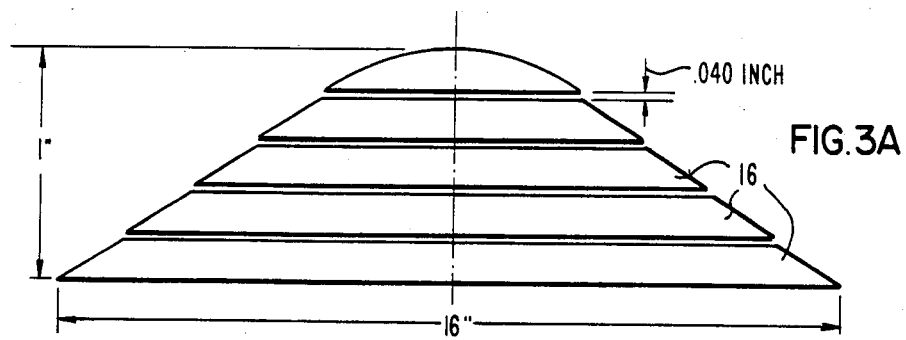
FIGS. 3A and 3B show a wedge-shaped tool for finishing a reactive metal strip.
Figure 3B:
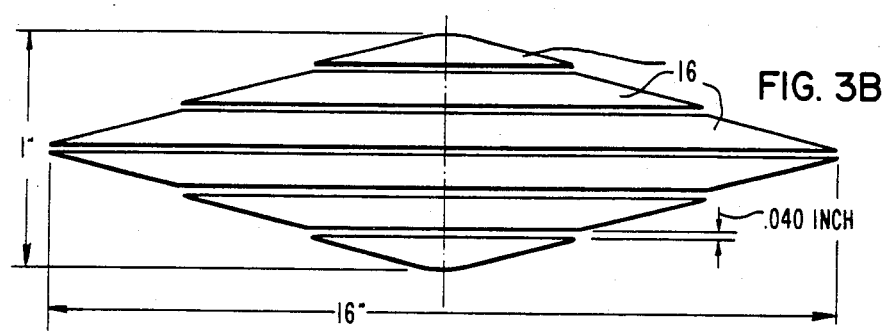
Figure 4:
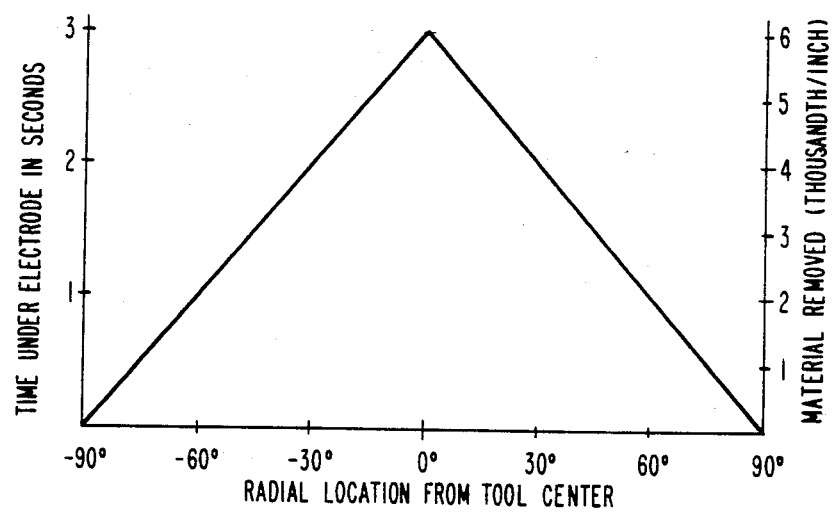
FIG. 4 is a graph showing material removal versus distance from the center line of a wedge shaped electrode.

FIGS. 3A and 3B illustrate conductive faces of wedge-shaped tools for use in electrochemical machining flat strip. The electrolyte is pumped to the periphery and flows across the conductive face and exits through the slots 16. Typically, this wedge shape approximates an isosceles triangle with a base larger than the two equal sides as such a shape gives good results and is easy to fabricate. As used herein, however, the term "wedge shape" means any roughly symmetrical shape, (including a flat domed shape, or a diamond shape as shown in FIG. 3B) which provides a longer time under the electrode for the center portion than for the portions on either side. FIG. 4 illustrates the "wedge-shaped" time under the electrode and material removal as functions of distance from the center of the electrode (perpendicular to the direction of travel) at a current of 1000 amperes for the configurations of FIGS. 3A and 3B.

Preferably, the speed of tool movement is maintained essentially constant and the current is varied proportionally to the amount of material to be removed. In some processes such as flat strip production, the crown tends to grow in a known manner during a production run. In such cases, the location and amplitude of the high spot can be measured on one or a relatively few workpieces and these results used to electrochemically machine multiple workpieces. This using of a single measure workpiece (or set of workpieces) to electrochemically machine multiple workpieces where the multiple workpieces are produced on the same equipment and thus presumably have similar deviations, reduces inspection time.

This technique has proved to be especially useful in the machining of zirconium alloys. In one example, a flat face workpiece was machined at a gap (tool-to-workpiece) setting of 0.022 inches and with feed rates of 0.5 inch per minute, 1.0 inch per minute, 2, 3, 4, and 18 inches per minute. Because of the parallel-to-face machining, insulator buttons can be used to maintain the gap spacing, and a zero angle tool can be used (the face of the tool is essentially parallel to the workpiece surface). There was no arcing at any speed.

In addition to varying the feed rate, the voltage (and thus the current) was also varied. Stock removal varied from 0.00025 inches and 18 inches per minute to 0.023 inches at 1 inch per minute feed rate.

Preferably, the electrolyte flow is from the perimeter seal inward. This inward (reverse) flow provides a controlled back pressure and provides a significantly smoother surface. It is felt that inward flow minimizes the instability caused by flow channeling of the normal, outward flow. Flow channeling tends to supply the greatest flow and thus the freshest electrolyte in areas where the flow channels are deepest. Thus, the outward flow is a destabilizing effect and tends to promote surface striations, rather than the desired surface smoothness. The more uniform back pressure of reverse (inward) flow minimizes this effect.

The invention is not to be construed as limited to the particular forms described herein, since these are to be regarded as illustrative rather than restrictive. The invention is intended to cover all processes which do not depart from the spirit and scope of the invention.

I claim:

1. An electrochemical machining process for removing high spots from the surface of reactive metal workpiece, said process comprising:
   a. measuring said workpiece to determine the position of a high spot and the amount of material to be removed;
   b. positioning a wedge-shaped, zero-angle electrochemical machining tool in line with the center of the high spot; and
   c. moving said tool parallel to the workpiece surface across said high spot at a product of current times inverse of speed essentially proportional to the amount of material to be removed.

2. The process of claim 1, wherein said surface is the exterior surface of a tube.

3. The process of claim 2, wherein said wedge-shaped tool has an active surface shaped to fit approximately halfway around the tube to be machined.

4. The process of claim 1, wherein said reactive metal workpiece is of a zirconium alloy.

5. The process of claim 1, wherein the speed of tool movement is maintained essentially constant and the current is varied proportionally to the amount of material to be removed.

6. The process of claim 1, wherein a high spot is measured on one workpiece and multiple workpieces are electrochemically machined in the same manner as required for said measured workpiece, whereby similar workpieces produced on the same equipment are presumed to have similar deviations and similarly machined, thus reducing inspection time.

* * * * *